Feb. 16, 1954 A. E. GLANCY ET AL 2,669,709
IMAGE PROJECTION OPTICAL SYSTEM
Filed Oct. 19, 1950 3 Sheets-Sheet 1

INVENTORS
ANNA E. GLANCY
JOHN K. DAVIS
BY
Louis L. Gagnon
ATTORNEY

Feb. 16, 1954   A. E. GLANCY ET AL   2,669,709
IMAGE PROJECTION OPTICAL SYSTEM
Filed Oct. 19, 1950   3 Sheets-Sheet 2

INVENTORS
ANNA E. GLANCY
JOHN K. DAVIS
BY
Louis L. Gagnon
ATTORNEY

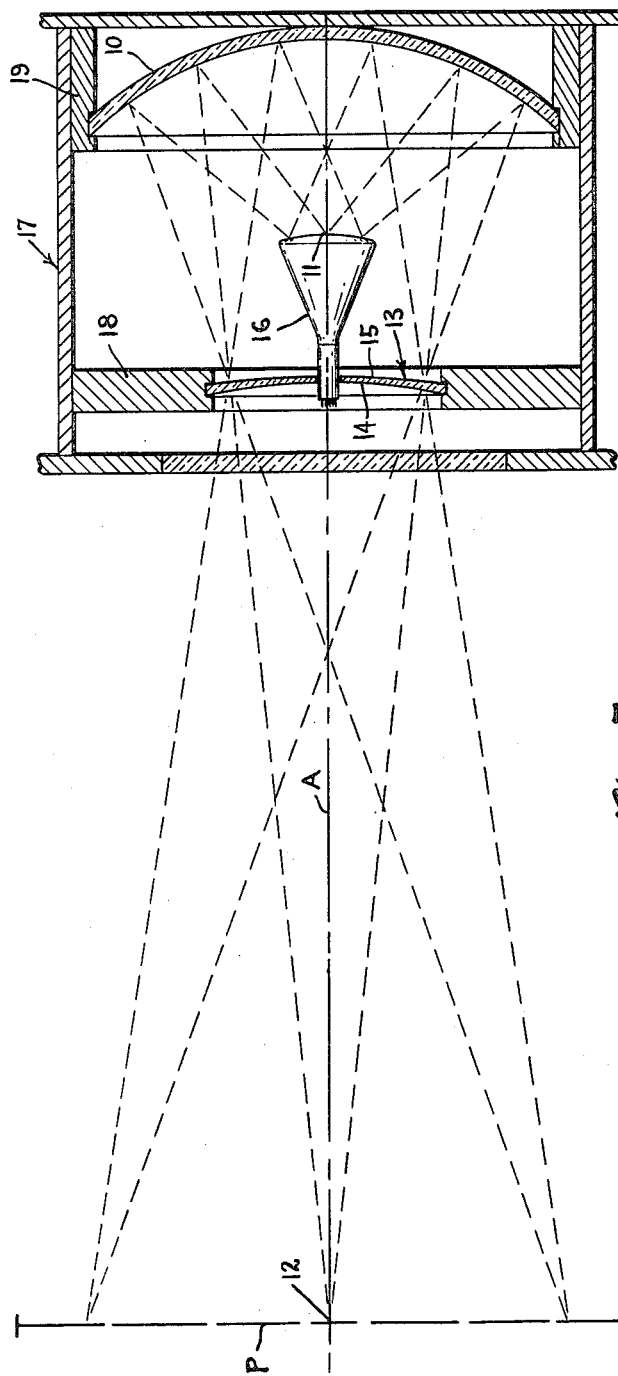

Patented Feb. 16, 1954

2,669,709

UNITED STATES PATENT OFFICE 2,669,709

IMAGE PROJECTION OPTICAL SYSTEM

Anna E. Glancy, Southbridge, Mass., and John K. Davis, East Woodstock, Conn., assignors to American Optical Company, Southbridge, Mass., a voluntary association of Massachusetts Application October 19, 1950, Serial No. 190,908

9 Claims. (Cl. 340—370)

This invention relates to optical systems and has particular reference to optical systems of the type used for projecting an enlarged image from an object to an image plane such as used in television receivers or the like.

A primary object of this invention is to provide an optical system embodying an object, an image of which is projected by means of a mirror through a correcting plate to an image plane located a finite distance therefrom wherein the various parts of the system are so constructed and arranged as to reduce astigmatism at wide field angles without affecting the resolution in the center of the image.

Another object is to provide an optical system of the above character wherein the correcting plate is axially aligned with the object, mirror and image plane and is shaped as a meniscus lens having opposed surfaces, one of which is spherical and the other aspherical, with the center of curvature of the spherical surface being substantially at the point of intersection of the axis of the system with said image plane.

Another object is the provision of an optical system of the above character wherein the center of curvature of the mirror is disposed on the axis of the system adjacent the location of intersection of said axis by the correcting lens of said system and preferably substantially at the principal point of the correcting lens which is nearer the mirror.

Another object is the provision of an improved optical system of the above character wherein the correcting plate is provided with an aspherical surface so formed that it functions cooperately with the spherical surface thereof to reduce field errors in the marginal areas of the resultant image without materially affecting the normally good resolution in the central area of the image.

Another object is to provide an improved correcting or zone plate of the above character which is controlled as to its optical characteristics so as to be interchangeable with correcting or zone plates presently used in many television, camera or similar projection type optical systems.

Other objects and advantages will become apparent from the following description taken in connection with the accompanying drawings, in which:

Fig. 5 is a diagrammatic sectional view of a portion of a television receiver embodying the present invention.

It has long been known that correcting or zone plates such as the "Schmidt" type which have been commonly used in optical systems of projection television receivers, cameras, and other similar articles of manufacture, possess certain deficiencies. Prior art correcting plates or lenses which cooperate with mirrors of given sizes and shapes to produce images at finite focal points from the mirror have been made which correct or reduce to a minimum spherical aberration. The performances of these systems, however, are still moderate due to the fact that the imagery will be satisfactory near the axis but may be very poor at points further removed from the axis owing to field errors.

Therefore, the problem has been primarily to improve the quality of the imagery for points removed from the axis of the system without sacrificing the good quality of the image adjacent the axis.

The present invention improves upon known prior art optical systems of this type through the provision of an axially aligned optical system utilizing a meniscus type correcting plate having a spherical surface with the center of curvature thereof being disposed substantially at the point of intersection of the axis of the system with the image plane, and having an opposed aspherical surface, with the center of curvature of the mirror being disposed on the axis of the system adjacent the location of intersection of said axis by the correcting lens or plate and preferably substantially at the principal point of the correcting lens which is nearer the mirror. With a system so constructed and arranged, the field errors of the system are greatly reduced, resulting in imagery of good quality through a wider field angle or effective area of the screen than has been heretofore possible while retaining the desired resolution adjacent the axis.

In the presently described correcting plate, both surfaces thereof do not have a common center and the centers of curvatures of the surfaces are not located at the center of curvature of the mirror as is required in some prior art systems. Also, the present improvements are accomplished by retention of a single corrector plate rather than embodying a plurality of optical elements for reducing field errors as is done in other more complicated and expensive prior art systems.

Figure 1:
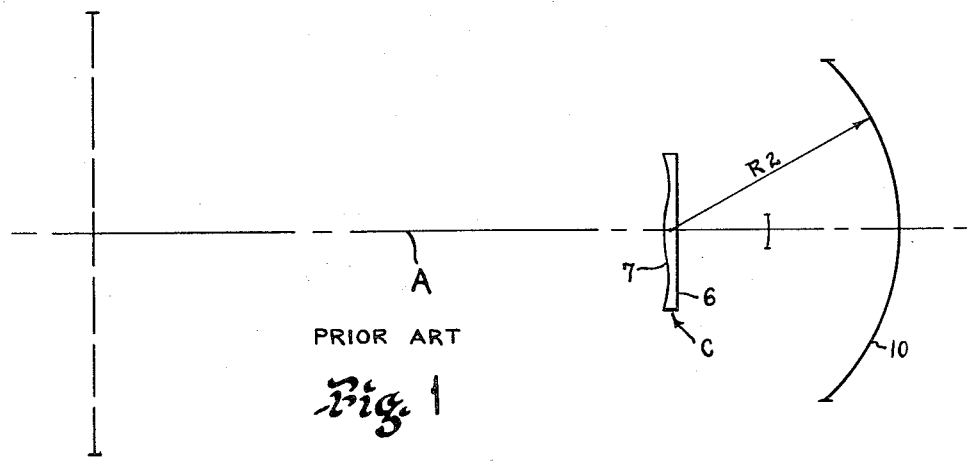
Fig. 1 is a diagrammatic illustration of a prior art system.
Figures 2, 2A:
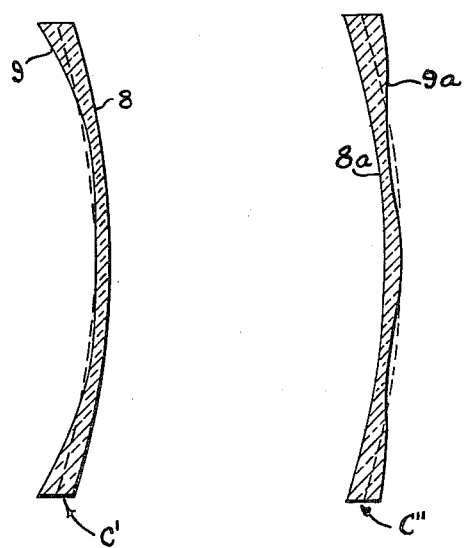
Fig. 2 is a diagrammatic illustration of the correcting plate embodying the invention.
Fig. 2A is a diagrammatic illustration like Fig. 2 but showing a further modification.

Referring more particularly to the drawings wherein like characters of reference designate like parts throughout the several views, in Fig. 1, there is diagrammatically illustrated an axially aligned optical system of conventional type which includes a corrector plate C of the "flat" type having one flat surface 6 and an opposed aspherical surface 7. It will be noted here that the center of curvature of the spherical mirror 10 used in the system is located substantially at the principal point of the corrector plate which is nearer the mirror as indicated by radius line R2. In Fig. 2, there is illustrated a correcting plate C' which is meniscus shaped in accordance with this invention, being provided with a spherical surface 8 on its convex side and an aspherical surface 9 on its concave side. A spherical curve parallel to the spherical surface 8 is shown by the dotted line to clearly indicate asphericity of surface 9. In Fig. 2A there is illustrated an alternative correcting plate C'' where the spherical surface 8a is on the concave side of the plate and the aspherical surface 9a is on its convex side.

Figure 3:
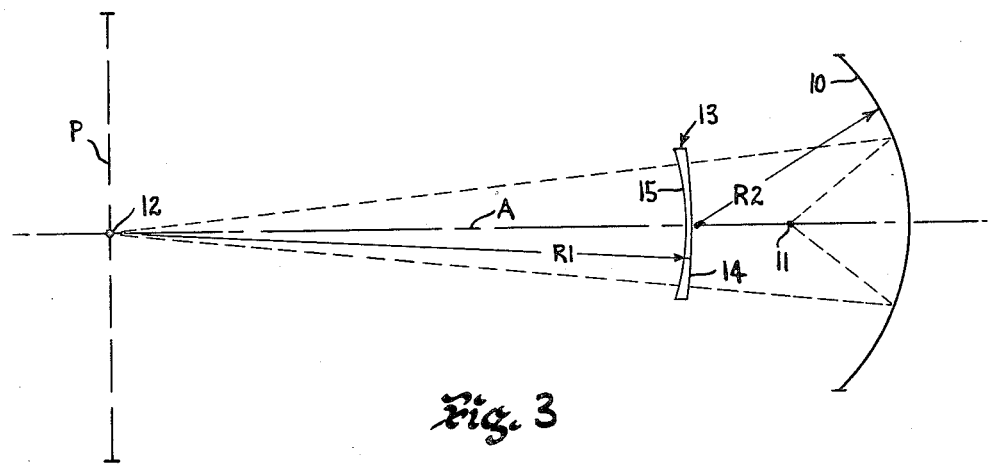
Fig. 3 is a diagram illustrating an optical system embodying the present invention.

Further details of a meniscus corrector plate of this character and of its use will be understood when read in conjunction with Fig. 3 of the drawings wherein there is diagrammatically illustrated an axially aligned optical system embodying the present invention. There is employed a spherical mirror 10 for projecting an image formed, for example, by a point source of light 11 to a focal point 12 located at a finite distance from the surface of the mirror 10 on an image plane P which is intersected at said focal point 12 by the axis A of the system, and a meniscus correcting plate 13 located in the path of light between the mirror 10 and focal point 12. The mirror 10 must, of course, be spaced a predetermined distance from the focal point 12 as well as from the correcting plate 13.

The surfaces of the correcting plate 13 are shaped to focus both axial and oblique light rays emitted by said light source 11 and reflected from the mirror 10 onto the focal point 12.

The correcting plate 13 in accordance with the present invention is a concavo-convex or meniscus lens which is shown as having its spherical curvature formed on the convex surface 14 and directed toward the mirror 10 and as having its aspherical curvature formed on the concave surface 15 and directed toward the focal point 12.

A further important feature of the presently described system is that the center of curvature of the spherical surface 14 of the corrector plate 13 is disposed substantially at the point of intersection of said axis A with the image plane P. This is indicated in Fig. 3 wherein radial line R1 indicates the radius of the curve of surface 14 and focal point 12 indicates the point of intersection of axis A with the image plane P. Another important feature is that the center of curvature of the mirror 10 lies on the axis of the system adjacent the location of intersection of said axis by the correcting plate and preferably substantially at the principal point of the correcting plate which is nearer the mirror. This is indicated in Fig. 3 by radial line R2.

To illustrate a specific optical system embodying the invention, the following illustration, which we shall designate Example A, is given:

When the object or point source of light 11 is located at a distance of approximately 189.4 mm. from the surface of the mirror 10 which has a radius of curvature of approximately 347.98 mm. and its center is located on axis A, the correcting plate 13 should be positioned with its spherical surface 14 located approximately 350.92 mm. from the mirror to focus properly on the image plane P located approximately 1037.64 mm. from the plate 13. The distances quoted here are measured along axis line A.

The center of curvature of the mirror 10 being substantially at the principal point of the correcting plate nearer the mirror, is, in this example, located adjacent the spherical surface of the correcting plate.

The center thickness of the correcting plate in this example is approximately 6.35 mm. Assuming that the plate 13 is fabricated of crown glass having an index of refraction of about 1.523, and the focal point 12 is located at a distance of approximately 1037.64 mm. from the concave aspheric surface of the correcting plate 13 as stated, the plate, in order to perform efficiently should have a convex spherical surface curvature of approximately 1043.99 mm. radius, with its center of curvature being disposed substantially at the point of intersection of axis A with the image plane P, and its concave aspherical surface should be curved whereby the light rays reflected from the mirror will focus properly upon the image plane. Several known methods may be used in figuring the exact curvature of the aspherical surface such as the method published in the July, 1946, issue of The Journal of the Optical Society of America by A. E. Glancy, pages 416 to 423 inclusive.

It is to be noted that the figures given in the above Example A are for a source 11 such as the tube face of a television system having as a factor of said Example the flattening of the curvature of the face of the tube from that of the common commercial type by approximately 15 per cent as a further aid in obtaining the desired results, the radius in said Example being approximately 207.00 millimeters.

It is, of course, known that in the absence of a correcting plate the axial rays from the source 11 will focus at a point further removed from the mirror 10 than the corrected focal point 12, while oblique rays from the source 11 and reflected from the marginal areas of the mirror 10 will focus at a point nearer the mirror 10 than corrected focal point 12. The surfaces of the correcting plate 13 are shaped, as described hereinbefore, to refract rays from the source 11 which are reflected by the mirror 10 onto the focal point 12 through said plate 13, and the resulting image will, through the use of a correcting plate of this nature, have good resolution throughout a wider field than has been heretofore possible.

However, it is to be understood that when forming a correcting plate for insertion in an optical system as a substitute for a flat plate, the correcting plate must be shaped in accordance with the spacing of the various elements of the system. Thus, as Example B, in an optical system embodying a mirror 10 having a curvature of approximately 347.98 mm. which is located approximately 192.17 mm. from the object 11, the correcting plate 13, in order to be inserted in the system without alteration thereof, should be so shaped that its spherical convex surface 14 will be spaced at a distance of approximately 337.81 mm. from the mirror. The center of curvature of the spherical surface, in accordance with this invention, will be placed at the point of intersection of the axis line A with the image plane, and, in this example, the radius is approximately 932.2 mm.

Assuming that the correcting plate 13 has an index of refraction and center thickness similar to the plate of the first above-mentioned example, the plate will be provided with a concave aspherical surface formed to a curvature figured in accordance with one of the methods mentioned above.

Figure 4:
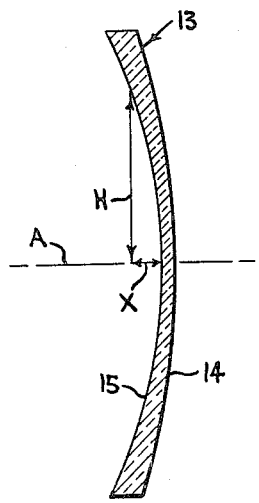
Fig. 4 is a vertical sectional view along a line passing through the center of a correcting plate illustrating the method of designating the aspherical curvature of one surface thereof.

To further complete Example B, the following Table A indicates the curvature of the aspherical surface and should be read in conjunction with Fig. 4 of the drawings wherein X designates the distance from the aspherical surface 15 along the axis A to a predetermined point and H indicates the distance to said surface 15 from said predetermined point along a line normal to said axis A.

Table A

| H | X | H | X | H | X |
|---|---|---|---|---|---|
| 1 | 0.0002 | 41 | 0.4559 | 81 | 2.4120 |
| 2 | 0.0010 | 42 | 0.4811 | 82 | 2.4954 |
| 3 | 0.0022 | 43 | 0.5072 | 83 | 2.5811 |
| 4 | 0.0039 | 44 | 0.5341 | 84 | 2.6692 |
| 5 | 0.0060 | 45 | 0.5620 | 85 | 2.7596 |
| 6 | 0.0087 | 46 | 0.5908 | 86 | 2.8527 |
| 7 | 0.0119 | 47 | 0.6206 | 87 | 2.9482 |
| 8 | 0.0155 | 48 | 0.6514 | 88 | 3.0464 |
| 9 | 0.0196 | 49 | 0.6832 | 89 | 3.1473 |
| 10 | 0.0243 | 50 | 0.7160 | 90 | 3.2509 |
| 11 | 0.0294 | 51 | 0.7498 | 91 | 3.3574 |
| 12 | 0.0351 | 52 | 0.7848 | 92 | 3.4668 |
| 13 | 0.0412 | 53 | 0.8208 | 93 | 3.5792 |
| 14 | 0.0479 | 54 | 0.8580 | 94 | 3.6947 |
| 15 | 0.0551 | 55 | 0.8964 | 95 | 3.8133 |
| 16 | 0.0629 | 56 | 0.9359 | 96 | 3.9351 |
| 17 | 0.0712 | 57 | 0.9767 | 97 | 4.0603 |
| 18 | 0.0800 | 58 | 1.0187 | 98 | 4.1888 |
| 19 | 0.0893 | 59 | 1.0620 | 99 | 4.3209 |
| 20 | 0.0993 | 60 | 1.1066 | 100 | 4.4566 |
| 21 | 0.1098 | 61 | 1.1526 | 101 | 4.5959 |
| 22 | 0.1208 | 62 | 1.1999 | 102 | 4.7390 |
| 23 | 0.1325 | 63 | 1.2486 | 103 | 4.8860 |
| 24 | 0.1447 | 64 | 1.2988 | 104 | 5.0370 |
| 25 | 0.1576 | 65 | 1.3505 | 105 | 5.1922 |
| 26 | 0.1710 | 66 | 1.4037 | 106 | 5.3515 |
| 27 | 0.1852 | 67 | 1.4584 | 107 | 5.5151 |
| 28 | 0.1999 | 68 | 1.5148 | 108 | 5.6833 |
| 29 | 0.2153 | 69 | 1.5728 | 109 | 5.8560 |
| 30 | 0.2313 | 70 | 1.6324 | 110 | 6.0334 |
| 31 | 0.2481 | 71 | 1.6938 | 111 | 6.2157 |
| 32 | 0.2655 | 72 | 1.7569 | 112 | 6.4030 |
| 33 | 0.2836 | 73 | 1.8219 | 113 | 6.5953 |
| 34 | 0.3024 | 74 | 1.8886 | 114 | 6.7930 |
| 35 | 0.3220 | 75 | 1.9573 | 115 | 6.9961 |
| 36 | 0.3424 | 76 | 2.0280 | 116 | 7.2048 |
| 37 | 0.3635 | 77 | 2.1006 | | |
| 38 | 0.3854 | 78 | 2.1752 | | |
| 39 | 0.4080 | 79 | 2.2520 | | |
| 40 | 0.4315 | 80 | 2.3309 | | |

It is to be noted that in Example B the center of curvature of the mirror is located adjacent the location of intersection of the axis of the system by the correcting plate and which, in this case, is on axis line A adjacent the aspherical surface 15.

As an example of the use to which such an optical system may be applied, reference is had to Fig. 5 of the drawings illustrating a portion of a conventional projection type television receiver wherein the point source of light 11 is exemplified by the center of a conventional fluorescent cathode ray tube 16 which is adapted to be held within an opening in the center of the correcting plate 13 which is supported in the receiver cabinet 17 by means such as frame 18, the tube 16 being supported within the opening in the correcting plate 13 by mounting supports not shown and the mirror 10 being supported at one end of the cabinet 17 by means such as a ringlike frame 19. The image receiving screen of the receiver is indicated by image plane P and may be formed as part of the receiver or as a separate member as shown. It is not believed necessary to recite in further detail the construction of the television receiver since the optical system embodying the present invention can be adapted for use in practically all known projection type television receivers.

The light rays which emanate from the point source 11 of the tube face which is on the axis A of the optical system will, upon being reflected from the mirror 10, be focused by the correcting plate 13 onto the focal point 12 which is also on the axis A of the system. Other light rays emanating from points on the marginal areas of the tube face will be reflected as shown in Fig. 5 by the mirror 10 through correcting plate 13 onto the image-receiving screen at points spaced outwardly from the focal point 12 but in the image plane P. The so-called oblique rays or rays projected to the marginal areas of the image plane are corrected by the plate 13 to a degree heretofore unapproachable in an optical system of this type, thereby producing an image having considerable reduction in field errors throughout the screen area.

It is to be understood that although the foregoing description includes specific measurements for spacing the various parts of particular optical systems and related parts of the devices to which they may be applied and for figuring the surface curvatures of the correcting plates, it is believed that the scope of this invention covers all similar structures formed to other measurements wherein the correcting plate is positioned with the center of curvature of its spherical surface substantially at the point of intersection of the axis of the system with the image plane or with the center of curvature of the mirror being disposed on the axis of the system adjacent the intersection of said axis by the correcting plate or substantially at the principal point of the correcting plate which is nearer the mirror.

It is apparent that many changes may be made in the details of construction and arrangement of parts shown and described without departing from the spirit of the invention as expressed in the accompanying claims. Therefore, it is to be understood that all matter set forth or shown in the accompanying drawing is to be interpreted as illustrative and not in a limiting sense.

We claim:

1. An image projection device comprising a light source, image receiving means spaced from said light source for receiving an image of said light source, and an axially aligned optical system for projecting said image of said light source upon said image receiving means, the axis of said optical system intersecting said image receiving means, said optical system comprising a concave reflector element positioned at a predetermined distance from said light source with its center of curvature lying substantially on said axis, said reflector element being adapted to receive light rays emitted by said light source and by reflection substantially focusing said light rays upon said image receiving means with some spherical aberration, and a meniscus-shaped correcting plate arranged to intercept said light rays reflected upon said image receiving means, said correcting plate being located in predetermined spaced relation with said reflector and image receiving means, and further having an aspherical surface on one side thereof to correct for said spherical aberration and a spherical surface on its opposed side, the center of curvature of which is effectively disposed substantially at the intersection of said axis by said image receiving means, and the center of curvature of said reflector being effectively located on said axis substantially at the intersection of said axis by said correcting plate, whereby said optical system projects a substantially uniformly clear image of said light source upon said image receiving means.

2. An image projection device comprising a light source, image receiving means spaced from said light source for receiving an image of said light source, and an axially aligned optical system for projecting said image of said light source upon said image receiving means, the axis of said optical system intersecting said image receiving means, said optical system comprising a concave reflector element having a surface curvature of radius of approximately 348 mm. positioned approximately 192 mm. from said light source with its center of curvature lying substantially on said axis, said reflector element being adapted to receive light rays emitted by said light source and to reflect said light rays upon said image receiving means, and a meniscus shaped correcting plate arranged to intercept said light rays reflected upon said image receiving means, said correcting plate being formed of a glass having an index of refraction of approximately 1.524 and having a concave aspherical surface of predetermined curvature directed toward said image receiving means, and further having an opposed convex spherical surface of a radius of approximately 932 mm. the center of curvature of which is effectively located substantially at the point of intersection of said axis by said image receiving means, said correcting plate being located on axis approximately 338 mm. from said reflector element and approximately 926 mm. from said image receiving means, said correcting plate further being adapted to correct for field errors whereby said optical system projects a substantially uniformly clear image of said light source upon said image receiving means.

3. A television image projection device comprising a cathode ray tube having a luminescent area whereupon an optical image is produced, a spherical reflector axially aligned with said tube and having its concave surface area positioned to receive the light of the image as produced upon the cathode ray tube, a screen located on the axis of said tube and reflector and so spaced therefrom as to permit substantial focusing of an image of the luminescent area of the tube thereon, and a correcting plate located outside the path of light from the tube to the reflector and axially aligned with said tube and reflector, said correcting plate being positioned to intercept the light reflected from the reflector and having a spherical surface on one side thereof, said correcting plate further having an aspherical surface on its opposed side for correcting spherical aberrations, said correcting plate being effectively bent to a substantially spherical shape defined about a center located along said axis adjacent the intersection thereof by the screen to reduce astigmatism at wide field angles without affecting substantially the resolution in the center of the image whereby a substantially uniformly clear enlarged image of the tube luminescent area is focused upon said screen.

4. The device according to claim 3 wherein the center of curvature of the reflector is located substantially at the intersection of said axis by the correcting plate.

5. An image projection device comprising a light source, image receiving means spaced from said light source for receiving an image of said light source, and an axially aligned optical system for projecting said image of said light source upon said image receiving means, the axis of said optical system intersecting said image receiving means, said optical system comprising a concave reflector element having a surface curvature of radius of approximately 348 mm. positioned approximately 189 mm. from said light source with its center of curvature lying substantially on said axis, said reflector element being adapted to receive light rays emitted by said light source and to reflect said light rays upon said image receiving means, and a meniscus shaped correcting plate arranged to intercept said light rays reflected upon said image receiving means, said correcting plate being formed of a glass having an index of refraction of approximately 1.524 and having a concave aspherical surface of predetermined curvature directed toward said image receiving means, and further having an opposed convex spherical surface of a radius of approximately 1044 mm. the center of curvature of which is located substantially at the point of intersection of said axis by said image receiving means, said correcting plate being located on axis approximately 351 mm. from said reflector and approximately 1038 mm. from said image receiving means, said correcting plate further being adapted to correct for field errors whereby said optical system projects a substantially uniformly clear image of said light source upon said image receiving means.

6. An optical system for image projection comprising an object plane, a reflector, a corrector plate and an image plane effectively in axial alignment and spaced relation with each other, the reflector having a concave spherical surface directed toward said object plane and defined by a radius whose center lies along said axis of the system, said radius being of such length and said reflector being so axially spaced from the object plane that light rays emanating from the object plane and reflected by said reflector will substantially focus at said image plane, said reflector further introducing amounts of spherical aberration, and said corrector plate being of generally meniscus shape with its concave side directed toward the image plane and positioned to intercept said light rays reflected by said reflector to the image plane, said corrector plate having on one side thereof an aspheric surface of predetermined curvature compensating for said spherical aberrations introduced by the reflector and having on its opposed side a spherical surface defined by a radius of curvature swung on a center effectively located approximately at the intersection of said image plane with the axis of the system, said corrector plate correcting for field errors whereby said optical system will provide a substantially uniformly clear image of an object at said object plane within a relatively wide field angle at said image plane.

7. An optical system for image projection comprising a reflector, a corrector plate and an image plane effectively in axial alignment and spaced relation with each other, the object whose image is to be projected by the optical system to its image plane normally being located between the reflector and the image plane, said reflector having a concave spherical surface directed toward the normal location for said object and defined by a radius whose center lies along the axis of the system, said radius being of such length and said reflector being so axially spaced from said location for the object that light rays emanating from the object and reflected by said reflector will substantially focus at said image plane, said reflector further introducing amounts of spherical aberration, and said corrector plate being of generally meniscus shape with its concave side directed toward the image plane and positioned substantially adjacent said center of curvature of the reflector to intercept said light rays reflected by said reflector to the image plane, said corrector plate having on one side thereof an aspheric surface of predetermined curvature compensating for said spherical aberrations introduced by the reflector and having on its opposed side a spherical surface defined by a radius of curvature swung on a center effectively located approximately at the intersection of said image plane with the axis of the system, said corrector plate reducing marginal astigmatism whereby said optical system will provide a substantially uniformly clear image of said object within a relatively wide field angle at said image plane.

8. An optical system for image projection comprising a reflector, a corrector plate and an image plane effectively in axial alignment and spaced relation with each other, the location for the object to be projected by the system to its image plane being effectively between the reflector and the image plane and with the corrector plate between the reflector and the image plane, said reflector being of concave spherical shape and directed toward said object and corrector plate, the center of curvature of said concave reflector being along the axis of the system and substantially at the principal point of the corrector plate nearer to said reflector, and the radius of curvature of said concave reflector being of such length and said reflector being so axially spaced from the location for the object that light rays emanating from the object and reflected by said reflector will substantially focus at said image plane, said reflector further introducing amounts of spherical aberration, and said corrector plate being of generally meniscus shape with its concave side directed toward the image plane and positioned to intercept said light rays reflected by said reflector to the image plane, said concave side of the corrector plate embodying an aspheric surface of predetermined curvature compensating for said spherical aberrations introduced by the reflector, said corrector plate having on its opposed side a spherical surface defined by a radius of curvature swung on a center effectively located approximately at the intersection of said image plane with the axis of the system to correct for field errors and provide a substantially uniformly clear image of said object within a relatively wide field angle at said image plane.

9. An image projection device comprising a light source, a reflector, a corrector plate and image receiving means effectively in axial alignment and spaced relation with each other, said reflector being of concave spherical shape and directed toward said light source with its center lying along the axis of the system, and the radius of curvature of said reflector being of such length and said reflector being so axially spaced from the light source that light rays emanating therefrom and reflected by said reflector will substantially focus at said image receiving means, said reflector further introducing amounts of spherical aberration, and said corrector plate being of generally meniscus shape with its concave side directed toward the image receiving means and positioned to intercept said light rays reflected by said reflector to the image receiving means, said corrector plate having on one side thereof an aspheric surface of predetermined curvature compensating for said spherical aberrations introduced by the reflector and having on its opposed side a spherical surface defined by a radius of curvature swung on a center effectively located approximately at the intersection of said image receiving means with the axis of the system to correct for marginal astigmatism whereby said optical system will provide a substantially uniformly clear image of said object within a relatively wide field angle at said image receiving means.

ANNA E. GLANCY.
JOHN K. DAVIS.

References Cited in the file of this patent

UNITED STATES PATENTS

| Number | Name | Date |
|---|---|---|
| 2,141,884 | Sonnefeld | Dec. 27, 1938 |
| 2,170,979 | Straubel | Aug. 29, 1939 |
| 2,273,801 | Landis | Feb. 17, 1942 |
| 2,309,788 | Ramberg | Feb. 2, 1943 |
| 2,510,521 | Rinia | June 6, 1950 |
| 2,518,067 | Rinia | Aug. 8, 1950 |

FOREIGN PATENTS

| Number | Country | Date |
|---|---|---|
| 544,694 | Great Britain | Apr. 23, 1942 |